US008619606B2

(12) United States Patent
Nagaraja

(10) Patent No.: US 8,619,606 B2
(45) Date of Patent: *Dec. 31, 2013

(54) DATA TRANSMISSION VIA A RELAY STATION WITH ACK/NACK FEEDBACK

(75) Inventor: Nagendra Nagaraja, Bangalore (IN)

(73) Assignee: QUALCOMM Incorporated, San Diego, CA (US)

(*) Notice: Subject to any disclaimer, the term of this patent is extended or adjusted under 35 U.S.C. 154(b) by 605 days.

This patent is subject to a terminal disclaimer.

(21) Appl. No.: 12/775,058

(22) Filed: May 6, 2010

(65) Prior Publication Data

US 2011/0273999 A1 Nov. 10, 2011

(51) Int. Cl.
*H04W 4/00* (2009.01)
*H04W 72/04* (2009.01)

(52) U.S. Cl.
USPC .......................... 370/252; 370/329; 370/341

(58) Field of Classification Search
None
See application file for complete search history.

(56) References Cited

U.S. PATENT DOCUMENTS

| 2007/0089015 | A1* | 4/2007 | Saul | 714/746 |
|---|---|---|---|---|
| 2007/0280188 | A1* | 12/2007 | Kang et al. | 370/338 |
| 2010/0014475 | A1* | 1/2010 | Horiuchi et al. | 370/329 |
| 2011/0044158 | A1* | 2/2011 | Tao et al. | 370/201 |
| 2011/0110284 | A1* | 5/2011 | Wu et al. | 370/312 |
| 2011/0167326 | A1* | 7/2011 | Kuri et al. | 714/807 |
| 2012/0114074 | A1* | 5/2012 | Moffatt et al. | 375/296 |
| 2012/0170485 | A1* | 7/2012 | Maeda et al. | 370/252 |

FOREIGN PATENT DOCUMENTS

EP 1855428 A2 11/2007
WO WO0201743 A1 1/2002

OTHER PUBLICATIONS

International Search Report and Written Opinion—PCT/US2011/035425—ISA/EPO—Dec. 19, 2011.
Laneman J N, et al., "Distributed space-time coded protocols for exploiting cooperative diversity in wireless networks", GLOBECOM02 2902—IEEE Global Telecommunications Conference, Conference Proceedings, Taipei, Taiwan, Nov. 17-21, 2002, New York, NY: IEEE, US, vol. 1, Nov. 17, 2002, pp. 77-81, XP010635917, DOI: 10.1109/GLOCOM.2002.1188045, ISBN: 978-0/7803-7632-8.
Liu, et al., "A Threshold-Based Hybrid Relay Selection Scheme", Wireless Communications and Networking Conference Workshops (WCNCW), 2010, IEEE, Piscataway, NJ, USA, Apr. 18, 2010, pp. 1-5, XP031691493, ISBN: 978-1-4244-6405-0.

(Continued)

*Primary Examiner* — Chi Pham
*Assistant Examiner* — Soon-Dong D Hyun
(74) *Attorney, Agent, or Firm* — Eric Ho

(57) ABSTRACT

Techniques for supporting communication by a relay station are described. In an aspect, the relay station may support NACK Type 1 when operating in an amplify-and-forward (AF) mode. The relay station may receive a first transmission of a packet from an upstream station, determine PAPR of the first transmission, and send NACK Type 1 to the upstream station if high PAPR is detected. In another aspect, the relay station may support NACK Type 1 and NACK Type 2 when operating in a decode-and-forward (DF) mode. The relay station may perform PAPR decoding for the first transmission, send NACK Type 1 if PAPR decoding fails, perform channel decoding if PAPR decoding passes, and send NACK Type 2 to the upstream station if channel decoding fails. In yet another aspect, the relay station may operate in the AF mode or the DF mode.

31 Claims, 10 Drawing Sheets

(56) References Cited

OTHER PUBLICATIONS

Souryal M R, et al., "Performance of Amplify-and-Forward and Decode-and-Forward Relaying in Rayleigh Fading with Turbo Codes", Acoustics, Speech and Signal Processing, 2006, ICASSP 2006 Proceedings, 2006 IEEE International Conference on Toulouse, France May 14-19, 2006, Piscataway, NJ, USA,IEEE, Piscataway, NJ, USA, May 14, 2006, p. IV, XP031386935, ISBN: 978-1-4244-0469-8. 0.

* cited by examiner

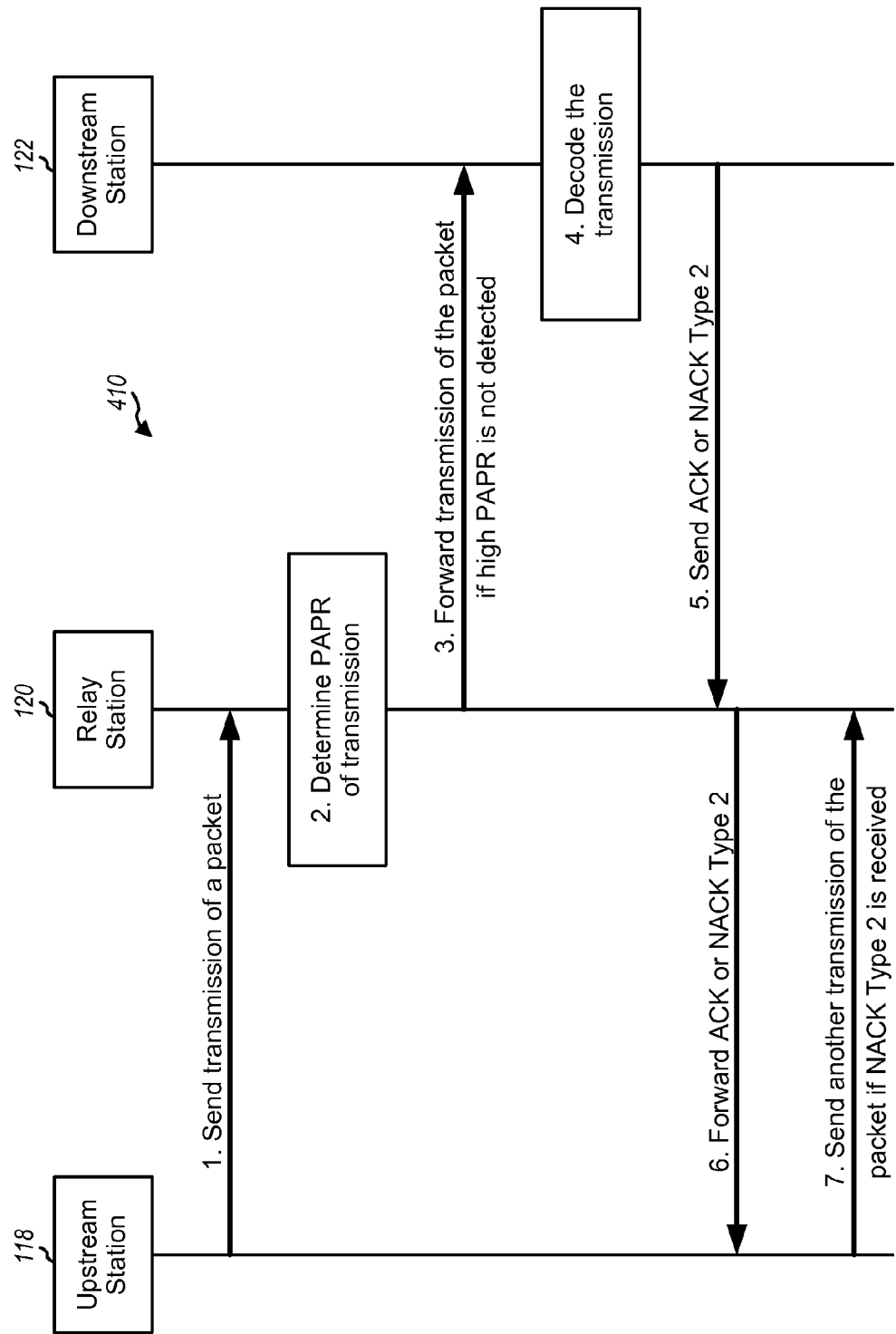

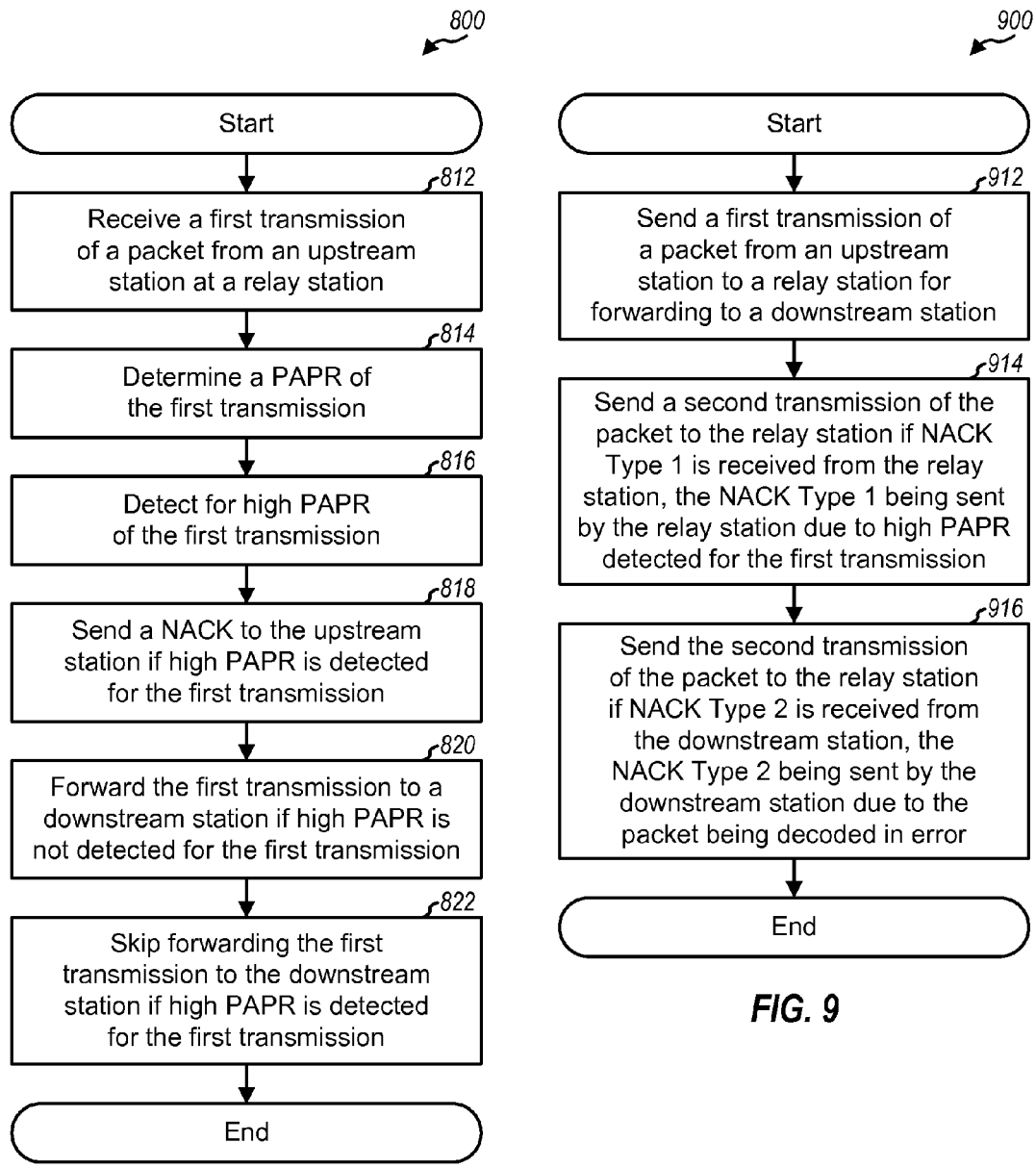

DATA TRANSMISSION VIA A RELAY STATION WITH ACK/NACK FEEDBACK

BACKGROUND

I. Field

The present disclosure relates generally to communication, and more specifically to techniques for transmitting data in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of wireless devices. A wireless device may communicate directly with a base station if a communication channel between the wireless device and the base station has acceptable quality. The wireless device may communicate indirectly with the base station via a relay station if the communication channel between the wireless device and the base station has poor quality. The relay station may facilitate communication between the wireless device and the base station by receiving a first signal from an upstream station (e.g., the base station), processing the first signal to obtain a second signal, and forwarding the second signal to a downstream station (e.g., the wireless device). The relay station may introduce additional latency/delay and may require additional processing. It may be desirable to efficiently support communication between the wireless device and the base station via the relay station.

SUMMARY

Techniques for supporting communication by a relay station are described herein. In an aspect, the relay station may support negative acknowledgement (NACK) when operating in an amplify-and-forward (AF) mode. In one design, the relay station may receive a first transmission of a packet from an upstream station when operating in the AF mode. The relay station may determine a peak-to-average-power ratio (PAPR) of the first transmission. The relay station may send a NACK to the upstream station if high PAPR is detected. The relay station may forward the first transmission to a downstream station if high PAPR is not detected and may skip forwarding the first transmission if high PAPR is detected. The upstream station may send another transmission of the packet in response to receiving the NACK from the relay station.

In another aspect, the relay station may support negative acknowledgement of a first type (NACK Type 1) and negative acknowledgement of a second type (NACK Type 2) when operating in a decode-and-forward (DF) mode. NACK Type 1 is NACK that is sent without performing channel decoding. NACK Type 2 is NACK that is sent due to channel decoding error. In one design, the relay station may receive a first transmission of a packet from the upstream station and may perform PAPR decoding for the first transmission. The relay station may send NACK Type 1 to the upstream station if the PAPR decoding fails. The relay station may perform channel decoding for the packet based on the first transmission if the PAPR decoding passes. The relay station may send NACK Type 2 to the upstream station if the packet is decoded in error and may send the first transmission of the packet to the downstream station if the packet is decoded correctly.

In yet another aspect, the relay station may be configurable to operate in either the AF mode or the DF mode. The AF mode or the DF mode may be selected based on one or more criteria such as hop distance, received signal quality, bit error rate (BER), packet error rate (PER), etc. The relay station may amplify and forward signals to support communication between the upstream and downstream stations if the AF mode is selected. The relay station may decode and forward signals to support communication between the upstream and downstream stations if the DF mode is selected. In one design, the relay station may support NACK Type 1 in the AF mode and may support NACK Type 1 and NACK Type 2 in the DF mode.

Various aspects and features of the disclosure are described in further detail below.

BRIEF DESCRIPTION OF THE DRAWINGS

FIGS. 4A and 4B show two message flows for data transmission via the relay station in the AF mode with NACK Type 1.

FIG. 8 shows a process for supporting communication by the relay station.

FIG. 9 shows a process for transmitting data by the upstream station.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies.

Figure 1:
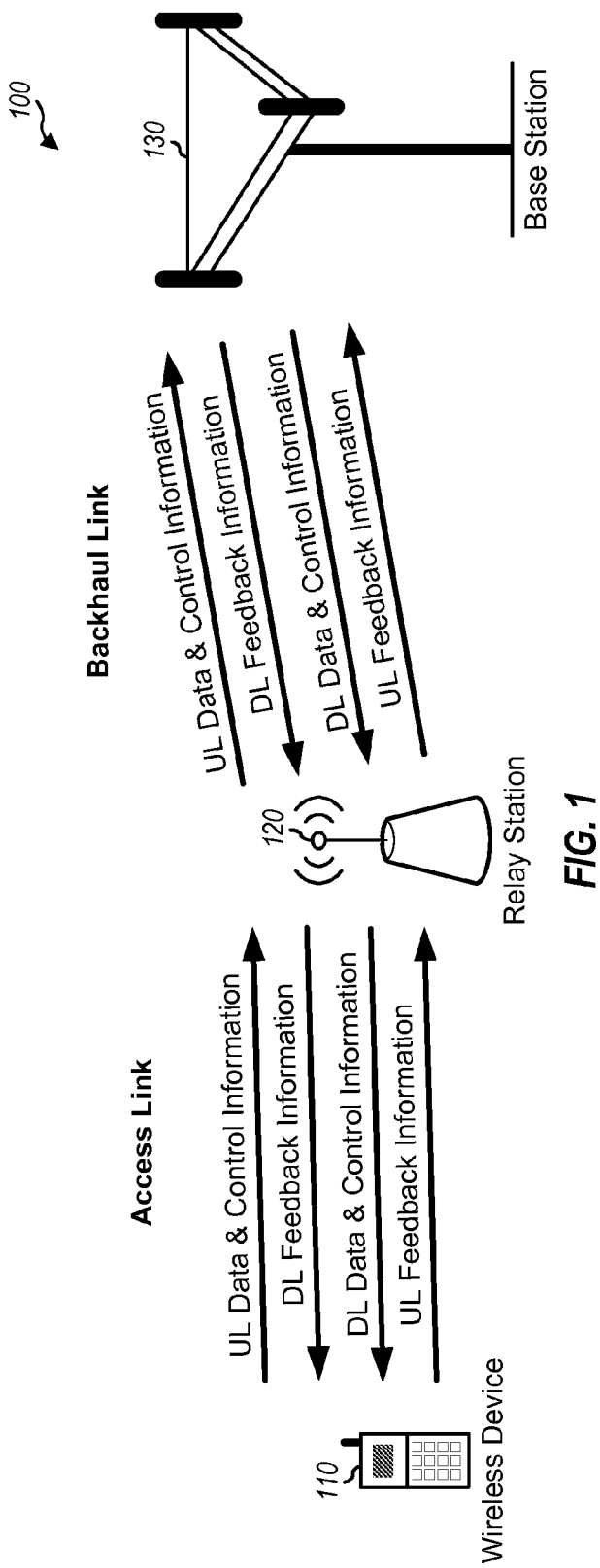
FIG. 1 shows a wireless communication system.

FIG. 1 shows a wireless communication system 100, which may include a number of base stations, relay stations, and other network entities. For simplicity, only one base station 130 and only one relay station 120 are shown in FIG. 1. A base station is a station that communicates with wireless devices and may also be referred to as a Node B, an evolved Node B (eNB), an access point, etc. A base station may provide communication coverage for wireless devices within a particular geographic area. A base station may communicate with a wireless device via the downlink and uplink. The downlink (or forward link) refers to the communication link from the base station to the wireless device, and the uplink (or reverse link) refers to the communication link from the wireless device to the base station.

A relay station is a station that receives a transmission of data and/or other information from an upstream station (e.g., a base station) and sends a transmission of the data and/or other information to a downstream station (e.g., a wireless device). A relay station may be a station that is dedicated to relaying transmissions for other stations. A relay station may also be a wireless device that can relay transmissions for other wireless devices. A relay station may also be referred to as a relay, a relay base station, etc. A relay station may communicate with a wireless device via an access link and may communicate with a base station via a backhaul link in order to support communication between the wireless device and the base station.

A wireless device 110 may be stationary or mobile and may also be referred to as a mobile station, a user equipment (UE), a terminal, an access terminal, a subscriber unit, a station, etc. Wireless device 110 may be a cellular phone, a personal digital assistant (PDA), a wireless modem, a handheld device, a laptop computer, a cordless phone, a wireless local loop (WLL) station, etc. Wireless device 110 may communicate directly with base station 130 (not shown in FIG. 1) or indirectly with base station 130 via relay station 120 (as shown in FIG. 1).

FIG. 1 also shows exemplary transmissions between wireless device 110 and base station 130 via relay station 120. For data transmission on the uplink (UL), wireless device 110 may transmit data and control information on an access uplink to relay station 120, which may forward the data and control information on a backhaul uplink to base station 130. Base station 130 may transmit feedback information on a backhaul downlink to relay station 120, which may forward the feedback information on an access downlink to wireless device 110. For data transmission on the downlink (DL), base station 130 may transmit data and control information on the backhaul downlink to relay station 120, which may forward the data and control information on the access downlink to wireless device 110. Wireless device 110 may transmit feedback information on the access uplink to relay station 120, which may forward the feedback information on the backhaul uplink to base station 130. The feedback information sent on one link (e.g., the downlink) may support data transmission on the other link (e.g., the uplink). The feedback information may comprise channel quality indicator (CQI) indicative of the quality of a communication channel, ACK for packets decoded correctly, NACK for packets decoded in error, and/or other information.

System 100 may support hybrid automatic retransmission (HARQ) for data transmission on the downlink and/or the uplink in order to improve reliability of data transmission. For HARQ, a transmitter may send a transmission of a data packet to a receiver and may send one or more additional transmissions of the packet, if needed, until the packet is decoded correctly by the receiver, or the maximum number of transmissions has been sent for the packet, or some other termination condition is encountered. Each transmission of the packet may include different redundancy information for the packet and may be referred to as an HARQ transmission. The receiver may decode the packet based on all HARQ transmissions received for the packet, which may improve the likelihood of correctly decoding the packet.

System 100 may utilize orthogonal frequency division multiplexing (OFDM) and/or single-carrier frequency division multiplexing (SC-FDM). For example, system 100 may be an LTE system that supports OFDM on the downlink and SC-FDM on the uplink. System 100 may also be a WiMAX system or a Wi-Fi system that supports OFDM on both the downlink and uplink. In any case, OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM.

OFDM and SC-FDM have certain desirable characteristics such as the ability to combat multipath effects. However, a major drawback with OFDM, and to a lesser extend with SC-FDM, is a high PAPR of an output signal, which means that the ratio of the peak power to the average power of the output signal can be high. For OFDM, the $N_{FFT}$ total subcarriers may be independently modulated with data, and high PAPR may result from possible in-phase addition of all of the subcarriers when they are independently modulated with data. In fact, it can be shown that the peak power may be up to Q times larger than the average power for OFDM, where Q is the number of subcarriers used for transmission.

A high PAPR of an output signal normally requires a power amplifier at a transmitter to be operated at an average power level that may be much lower than the peak power level, i.e., backed off from peak power. This is because large peaks in the output signal may cause the power amplifier to operate in a highly non-linear region or possibly clip, which may then cause intermodulation distortion and other artifacts that may degrade performance. By operating the power amplifier at a back-off from peak power, the power amplifier can handle large peaks in the output signal without generating excessive distortion. However, the back-off represents inefficient operation of the power amplifier during other times when large peaks are not present in the output signal.

Figure 2:
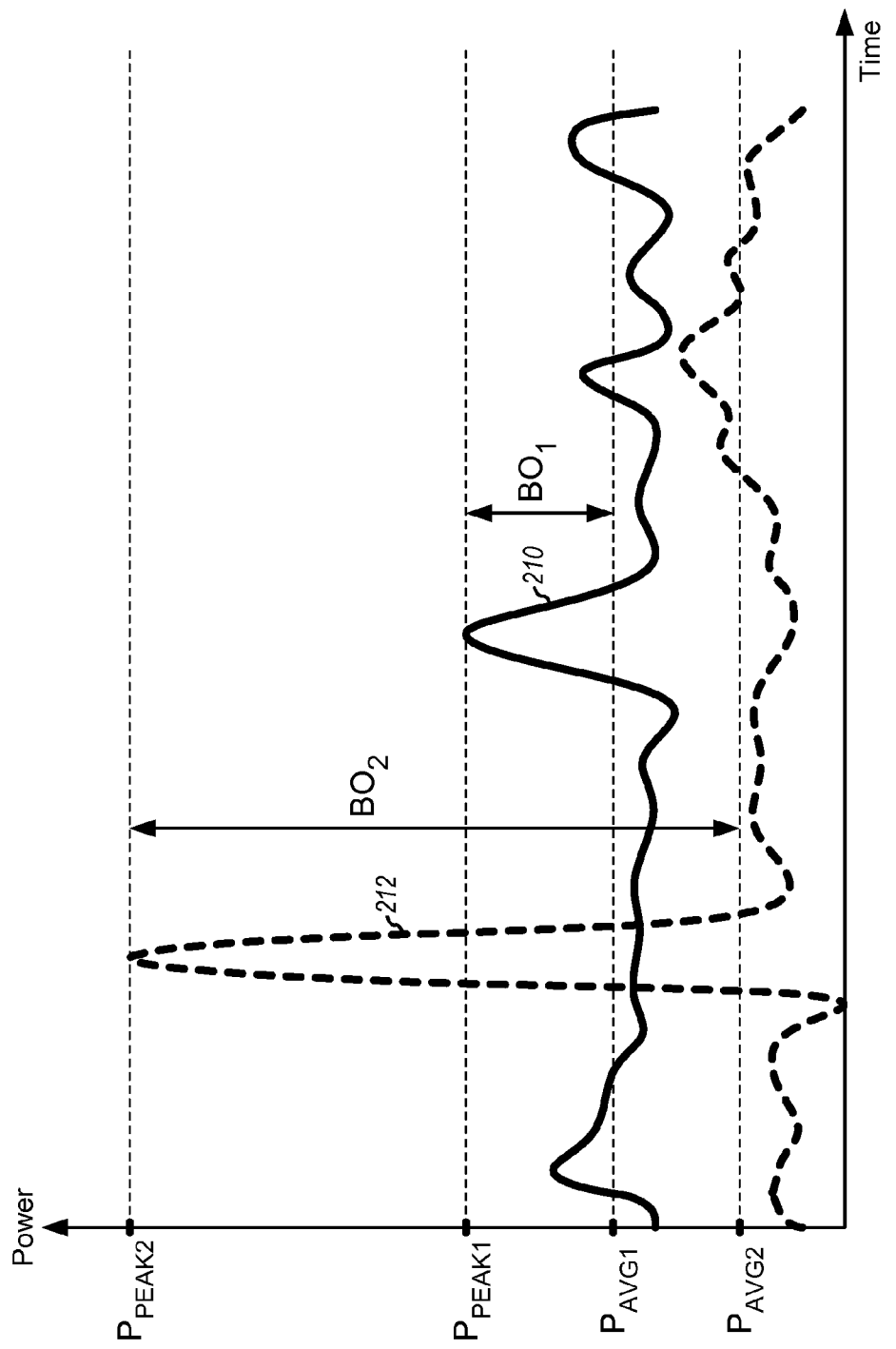
FIG. 2 shows plots of two signals with different PAPR.

FIG. 2 shows plots of two output signals 210 and 212 with different PAPR. The horizontal axis denotes time and the vertical axis denotes power. Output signal 210 has an average power of $P_{AVG1}$ and a peak power of $P_{PEAK1}$. Output signal 212 has an average power of $P_{AVG2}$ (which is lower than $P_{AVG1}$) and a peak power of $P_{PEAK2}$ (which is higher than $P_{PEAK1}$).

To limit the amount of intermodulation distortion, a power amplifier may be operated at an average power level that is backed off from the maximum power level of the power amplifier. The amount to back off is selected such that the power amplifier does not (or minimally) operate in a highly non-linear region or clip. More specifically, the back-off is normally selected such that the distortion generated by the power amplifier is limited to a particular level. If the maximum power level of the power amplifier is equal to the peak power of an output signal, then the back-off may be equal to the PAPR of the output signal. As shown in FIG. 2, a smaller back-off of $BO_1$ may be used for output signal 210 due to a smaller PAPR, and a larger back-off of $BO_2$ may be used for output signal 212 due to a larger PAPR.

System 100 may support data transmission with feedback of ACK and NACK in order to address high PAPR and improve performance. A transmitter may send a transmission of a data packet with channel encoding and either with or without PAPR encoding. A receiver may receive and process the transmission of the packet and may send NACK Type 1 if PAPR encoding is performed by the transmitter and PAPR decoding by the receiver fails. The receiver may also send NACK Type 1 if PAPR encoding is not performed by the transmitter and high PAPR is detected by the receiver. The receiver may perform channel decoding if NACK Type 1 is not sent. The receiver may send NACK Type 2 if channel decoding is unsuccessful and may send an ACK if channel decoding is successful. The transmitter may generate another transmission of the packet with different PAPR encoding and/or different channel encoding if NACK Type 1 or NACK Type 2 is received and may send this transmission of the packet to the receiver. The processing by the transmitter and receiver are described in further detail below.

Figure 3:
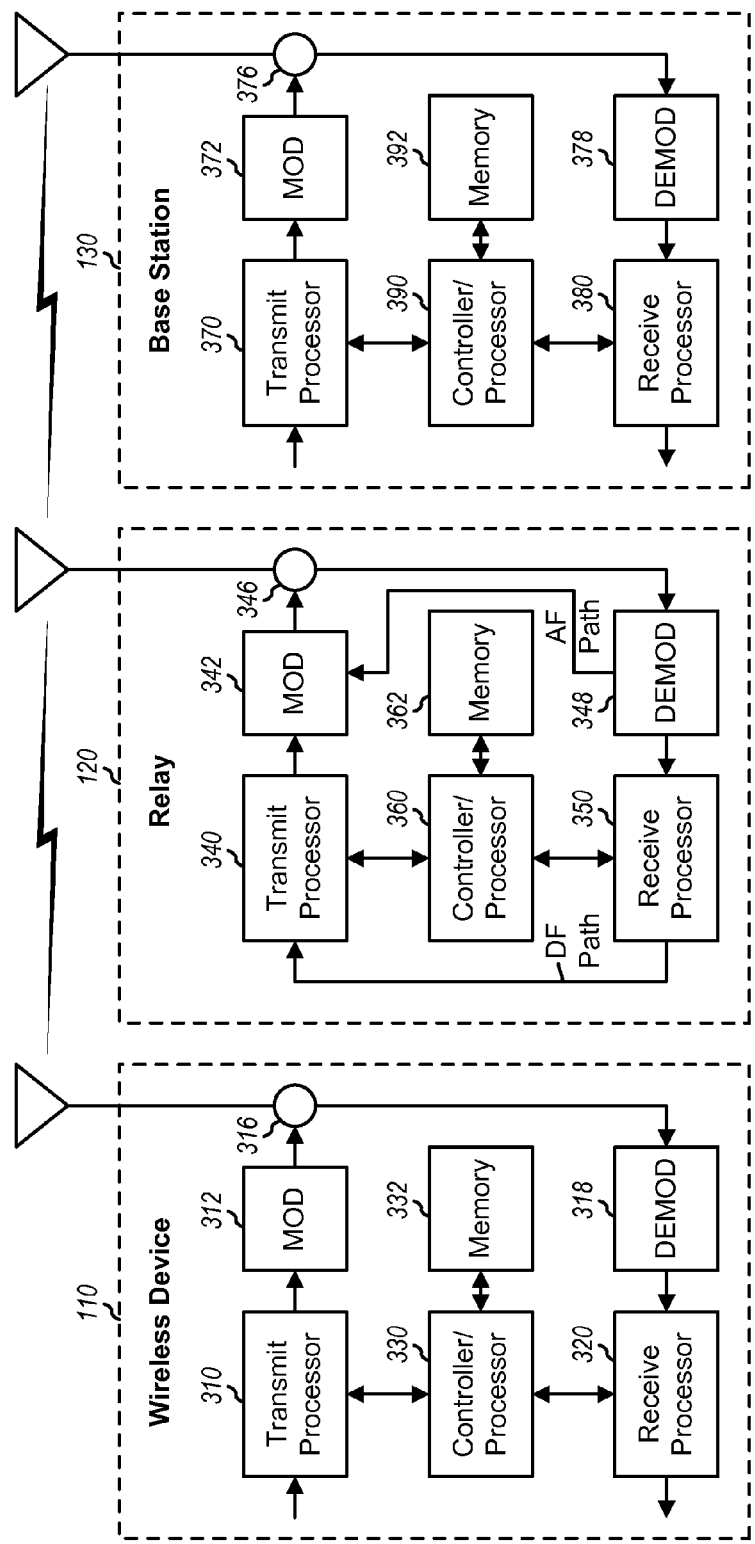
FIG. 3 shows a block diagram of a wireless device, a relay station, and a base station.

FIG. 3 shows a block diagram of a design of wireless device 110, relay station 120, and base station 130. At wireless device 110, a transmit processor 310 may receive data to transmit and may process (e.g., encode, interleave, and symbol map) the data in accordance with a modulation and coding scheme to obtain data symbols. Transmit processor 310 may also process control and/or feedback information to obtain control symbols. Transmit processor 310 may then multiplex the data symbols, the control symbols, and pilot symbols. As used herein, a data symbol is a symbol for data, a control symbol is a symbol for control or feedback information, a pilot symbol is a symbol for pilot or reference signal, and a symbol may be a real or complex value. Pilot is data that is known a priori by both a transmitter and a receiver. A modulator (MOD) 312 may process the multiplexed symbols (e.g., for OFDM, SC-FDM, etc.) to generate output samples. Modulator 312 may further condition (e.g., convert to analog, amplify, filter, and upconvert) the output samples to generate an uplink signal, which may be routed through a duplexer/switch 316 and transmitted to relay station 120 and/or base station 130.

At relay station 120, the uplink signal from wireless device 110 may be routed through a duplexer/switch 346 and conditioned (e.g., filtered, amplified, downconverted, and digitized) by a demodulator (DEMOD) 348 to obtain input samples. Demodulator 348 may further process the input samples (e.g., for OFDM, SC-FDM, etc.) to obtain received symbols. A receive processor 350 may process (e.g., symbol demap, deinterleave, and decode) the received symbols to recover data and other information transmitted by wireless device 110.

On the backhaul uplink, a transmit processor 340 may process (e.g., encode interleave, and symbol map) the data and other information received from wireless device 110 to obtain data symbols and control symbols. A modulator 342 may process the data symbols, the control symbols, and pilot symbols (e.g., for OFDM, SC-FDM, etc.) to obtain output samples. Modulator 342 may further condition the output samples to generate a backhaul uplink signal, which may be routed through duplexer/switch 346 and transmitted to base station 130.

At base station 130, the backhaul uplink signal from relay station 120 may be received and routed through a duplexer/switch 376, conditioned and processed by a demodulator 378, and further processed by a receive processor 380 to recover the data and other information transmitted by relay station 120.

On the backhaul downlink, at base station 130, data and other information intended for wireless device 110 may be processed by a transmit processor 370 and further processed and conditioned by a modulator 372 to generate a backhaul downlink signal, which may be transmitted to relay station 120. At relay station 120, the backhaul downlink signal may be received and processed by demodulator 348 and further processed by receive processor 350 to recover the data and other information transmitted to wireless device 110.

On the access downlink, at relay station 120, data and other information for wireless device 110 may be processed by transmit processor 340 and conditioned by modulator 342 to generate an access downlink signal, which may be transmitted to wireless device 110. At wireless device 110, the access downlink signal may be received and processed by a demodulator 318 and further processed by a receive processor 320 to recover the data and other information transmitted to wireless device 110.

Controllers/processors 330, 360 and 390 may control the operation at wireless device 110, relay station 120, and base station 130, respectively. Memories 332, 362 and 392 may store data and program codes for wireless device 110, relay station 120, and base station 130, respectively.

In one design, relay station 120 may support one or more of the relay modes shown in Table 1. Relay station 120 may also support different NACK types for different relay modes, e.g., as shown in Table 1 and described below.

TABLE 1

Relay Modes

| Relay Mode | Description | NACK Type |
|---|---|---|
| Amplify-and-forward (AF) | Amplify a received signal and transmit the amplified signal, without decoding the received signal. | NACK Type 1 |
| Decode-and-forward (DF) | Decode a received signal to recover data sent in the signal. Process the data to obtain a modulated signal and transmit the modulated signal. | NACK Types 1 & 2 |

In an aspect, relay station 120 may support NACK Type 1 when operating in the AF mode. Relay station 120 may receive a transmission of a packet from an upstream station and may perform PAPR detection to detect for high PAPR. Relay station 120 may send NACK Type 1 if high PAPR is detected. Relay station 120 may forward the transmission of the packet to a downstream station if high PAPR is not detected.

Figure 4A:
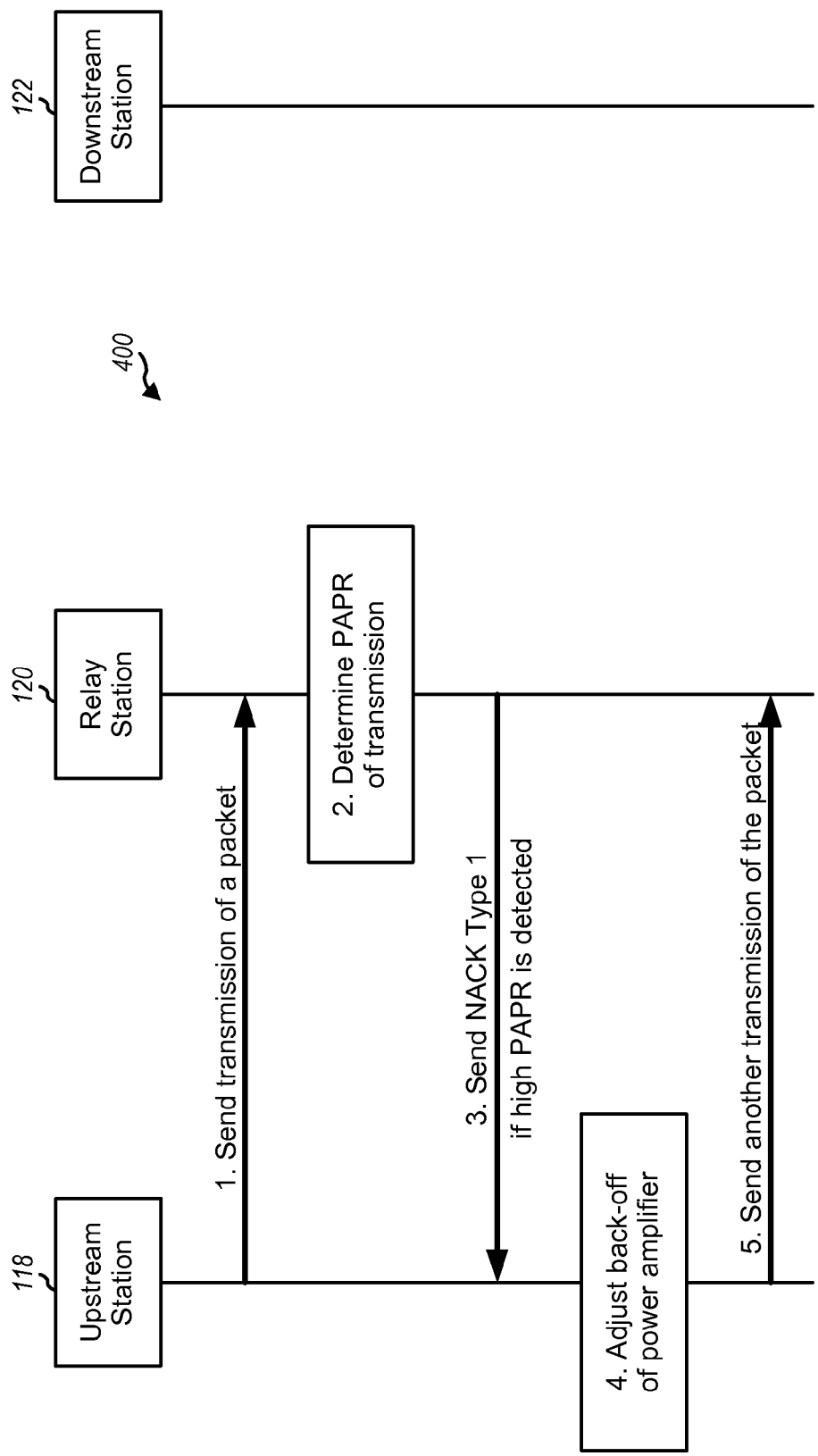

FIG. 4A shows a design of a message flow 400 for data transmission via relay station 120 in the AF mode with NACK Type 1. An upstream station 118 may send data transmission to a downstream station 122 via relay station 120. For data transmission on the downlink, upstream station 118 may be base station 130, and downstream station 122 may be wireless device 110. For data transmission on the uplink, upstream station 118 may be wireless device 110, and downstream station 122 may be base station 130. For both cases, data transmission may be sent with channel encoding and without PAPR encoding.

Upstream station 118 may send an HARQ transmission for a packet to downstream station 118 (step 1). Relay station 120 may receive the HARQ transmission and may determine the PAPR of the HARQ transmission (step 2). Relay station 120 may send NACK Type 1 to upstream station 118 if high PAPR is detected (step 3). In one design, relay station 120 may skip forwarding the HARQ transmission to downstream station 122 if high PAPR is detected, as shown in FIG. 4A. In another design, relay station 120 may forward the HARQ transmission to downstream station 122 even if high PAPR is detected (not shown in FIG. 4A). Upstream station 118 may receive NACK Type 1 from relay station 120 and may adjust one or more transmission parameters to mitigate high PAPR (step 4). For example, upstream station 118 may increase the back-off of its power amplifier and may operate at a lower average transmit power level if high PAPR is detected in order to prevent clipping and reduce intermodulation distortion. Upstream station 118 may send another HARQ transmission for the packet in response to receiving NACK Type 1 from relay station 120 (step 5).

FIG. 4B shows a design of a message flow 410 for data transmission via relay station 120 in the AF mode with NACK Type 1. Upstream station 118 may send an HARQ transmission for a packet to downstream station 118 (step 1). Relay station 120 may receive the HARQ transmission and may determine the PAPR (step 2). Relay station 120 may forward the HARQ transmission to downstream station 122 if high PAPR is not detected (step 3). Downstream station 122 may receive the HARQ transmission from relay station 120 and may decode the packet based on the HARQ transmission (step 4). Downstream station 122 may send ACK if the packet is decoded correctly or NACK Type 2 if the packet is decoded in error (step 5). Relay station 120 may receive the ACK or NACK Type 2 from downstream station 122 and may forward the ACK or NACK Type 2 to upstream station 118 (step 6). Upstream station 118 may receive the ACK or NACK Type 2, may terminate transmission of the packet if ACK is received (not shown in FIG. 4B) and may send another HARQ transmission for the packet if NACK Type 2 is received (step 7).

Figure 5:
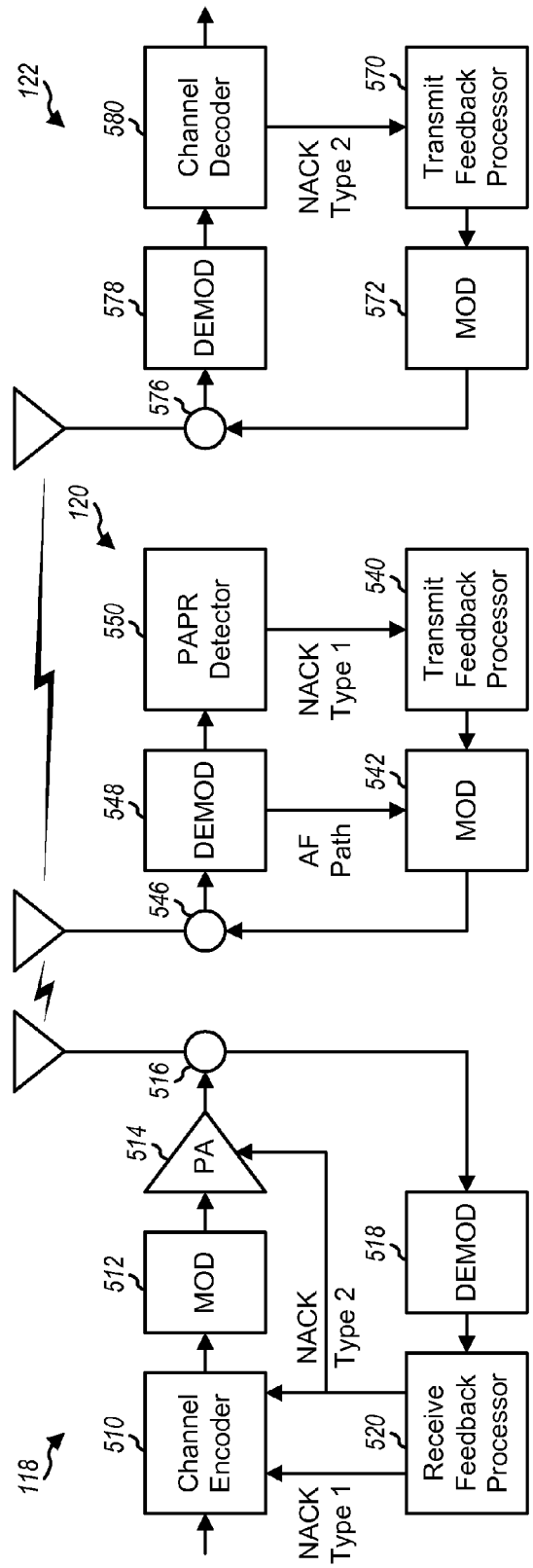
FIG. 5 shows a block diagram of an upstream station, the relay station, and a downstream station, which support the message flows in FIGS. 4A and 4B.

FIG. 5 shows a block diagram of a design of upstream station 118, relay station 120, and downstream station 122, which may support message flows 400 and 410 in FIGS. 4A and 4B, respectively. At upstream station 118, a channel encoder 510 (which may be part of transmit processor 310 or 370 in FIG. 3) may receive a packet of data to transmit to downstream station 122 and may process the packet to obtain a corresponding coded packet. For example, channel encoder 510 may generate a cyclic redundancy check (CRC) for the packet, append the CRC to the packet, and encode the packet and the CRC (e.g., with a convolutional code, a Turbo code, a low density parity check (LDPC) code, a block code, and/or some other code) to obtain the coded packet. For HARQ, channel encoder 510 may partition the coded packet into multiple blocks of code bits, one block for each HARQ transmission. Each block may include different code bits (i.e., different redundancy information) for the packet. Channel encoder 510 may interleave (or reorder) each block of code bits and may map the interleaved bits to data symbols. Channel encoder 510 may also process control information to obtain control symbols.

A modulator 512 may process the data symbols, the control symbols, and pilot symbols (e.g., for OFDM, SC-FDM, etc.) to obtain output samples. Modulator 512 may further condition (e.g., convert to analog, filter, amplify, and upconvert) the output samples to generate a downstream signal. The downstream signal may be amplified by a power amplifier (PA) 514, routed through a duplexer/switch 516 and transmitted to relay station 120 and/or downstream station 122.

Upstream station 118 may receive an upstream relay signal from relay station 120, and the received signal may be routed through duplexer/switch 516 and processed by a demodulator 518 to obtain received symbols. A receive feedback processor 520 (which may be part of receive processor 320 or 380 in FIG. 3) may process the received symbols to recover feedback information sent by relay station 120. The feedback information may comprise (i) NACK Type 1 from relay station 120 and/or (ii) ACK or NACK Type 2 from downstream station 122. Upstream station 118 may control data transmission based on the feedback information. For example, upstream station 118 may send another HARQ transmission for the packet if NACK Type 1 is received from relay station 120 or NACK Type 2 is received from downstream station 122. Upstream station 118 may adjust the back-off of power amplifier 514 if NACK Type 1 is received from relay station 120. Upstream station 118 may also terminate transmission of the packet if ACK is received from downstream station 122.

Relay station 120 may receive the downstream signal from upstream station 118. The received signal may be routed through a duplexer/switch 546 and processed by a demodulator 548 to obtain input samples. A PAPR detector 550 (which may be part of receive processor 350 in FIG. 3) may compute the PAPR of an HARQ transmission for a packet based on the input samples for the HARQ transmission, as follows:

$$PAPR = \frac{\max_k\{x_k^2\}}{P_{avg}}, \text{ and} \quad \text{Eq (1)}$$

$$P_{avg} = \frac{1}{K} \cdot \sum_k x_k^2, \quad \text{Eq (2)}$$

where $x_k$ denotes a complex value for the k-th input sample for the HARQ transmission, $P_{avg}$ is the average power of the HARQ transmission, and K denotes the number of input samples used to compute PAPR.

PAPR detector 550 may also compute the PAPR of the HARQ transmission in other manners, e.g., as described by Tarokh et al in a paper entitled "On the computation and reduction of the peak-to-average power ratio in multicarrier communications," IEEE Transactions on Communications, Volume 48, Issue 1, January 2000, pages 37-44.

In one design, PAPR detector 550 may compare the computed PAPR against a PAPR threshold, which may be set to a suitable value based on various criteria. For example, the PAPR threshold may be set based on decoding capability of a channel decoder 580 in downstream station 122. The PAPR threshold may also be set based on channel conditions observed by downstream station 122, the back-off of power amplifier 514 in upstream station 118, and/or other criteria. In general, progressively higher PAPR threshold may be used for progressively more powerful decoding capability, progressively higher received signal quality, and/or progressively larger back-off. An appropriate PAPR threshold may be determined based on computer simulation, empirical measurement, etc. In any case, PAPR detector 550 may detect high PAPR if the computed PAPR exceeds the PAPR threshold. If high PAPR is not detected, then the downstream signal may be conditioned (e.g., filtered and amplified) by a modulator 542 to generate a downstream relay signal, which may be routed through duplexer/switch 546 and transmitted to downstream station 122. Conversely, if high PAPR is detected, then PAPR detector 550 may provide NACK Type 1. Feedback information comprising NACK Type 1 may be processed (e.g., encoded and symbol mapped) by a transmit feedback processor 540 (which may be part of transmit processor 340 in FIG. 3), further processed by modulator 542, routed through duplexer/switch 546, and transmitted to upstream station 118.

Downstream station 122 may receive the downstream relay signal from relay station 120. The received signal may be routed through a duplexer/switch 576 and processed by a demodulator 578 to obtain input samples. Demodulator 578 may also perform demodulation on the input samples (e.g., for OFDM, SC-FDM, etc.) to obtain received symbols. A channel decoder 580 (which may be part of receive processor 320 or 380 in FIG. 3) may then process (e.g., symbol demap, deinterleave, and decode) the received symbols to obtain a decoded packet. Channel decoder 580 may also check the decoded packet based on the CRC for the packet to determine whether the packet is decoded correctly or in error. Channel decoder 580 may provide NACK Type 2 if the packet is decoded in error and may provide ACK if the packet is decoded correctly.

A transmit feedback processor 570 (which may be part of transmit processor 310 or 370 in FIG. 3) may receive feedback information, which may comprise ACK or NACK Type 2 from channel decoder 580 and CQI from a channel processor (not shown in FIG. 5). The feedback information may be processed (e.g., encoded, interleaved, and symbol mapped) by transmit feedback processor 570, further processed by a modulator 572, routed through duplexer/switch 576, and transmitted to relay station 120 and/or upstream station 118.

FIG. 5 shows an exemplary design of upstream station 118, relay station 120, and downstream station 122, which support NACK Type 1 feedback for relay station 120 operating in the AF mode. NACK Type 1 feedback by relay station 120 may also be supported in other manners. For example, upstream station 118 may compute the PAPR of an HARQ transmission and may send the PAPR on an inband channel along with the HARQ transmission, or a paging channel, or a dedicated PAPR channel, or some other channel. Relay station 120 may receive the PAPR of the HARQ transmission from upstream station 118 and may not compute the PAPR. Relay station 120 may compare the received PAPR against the PAPR threshold, which may be set based on the decoding capability of downstream station 122, the channel conditions observed by relay station 120 and/or downstream station 122, the back-off used by upstream station 118, and/or other criteria. Relay station 120 may also detect for high PAPR in other manners.

As shown in FIGS. 4A, 4B and 5, relay station 120 may support NACK Type 1 feedback even when upstream station 118 does not implement PAPR encoding for PAPR reduction. PAPR detection by relay station 120 may be less computationally intensive, may be performed by a "front end" of relay station 120, and may have shorter delay. Channel decoding by downstream station 122 may be more computationally intensive, may be performed by a "back end" of downstream station 122, and may have longer delay. Channel decoding may be more powerful but may likely fail when high PAPR is detected. Hence, sending NACK Type 1 for high PAPR may result in less delay for retransmission and may reduce computation by downstream station 122. Sending NACK Type 2 for channel decoding failure may improve decoding performance due to retransmission. The two levels of NACK feedback by relay station 120 and downstream station 122 may thus reduce delay and improve performance.

In another aspect, relay station 120 may be configurable to operate in either the AF mode or the DF mode. The AF mode may have less latency, less processing for relay station 120, and possibly better performance under some operating scenarios. The DF mode may have more latency, lower error rate, and possibly better performance under other operating scenarios. The AF mode or the DF mode may be selected based on various criteria to obtain better performance.

In one design, the AF mode or the DF mode may be selected based on hop distance. The AF mode may be selected when the hop distance is small and may have better performance in this case. Conversely, the DF mode may be selected when the hop distance is large and may have better performance in this case.

In one design, the hop distance may be set equal to the larger of (i) a first distance between relay station 120 and downstream station 118 and (ii) a second distance between relay station 120 and upstream station 122. The hop distance may be compared against a distance threshold. The AF mode may be selected if the hop distance is less than the distance threshold. The DF mode may be selected if the hop distance is greater than the distance threshold. Relay station 120, downstream station 118, and/or upstream station 122 may be mobile, and the first distance and/or the second distance may vary over time. The hop distance may be determined periodically, and the AF mode or the DF mode may be selected whenever the hop distance is determined.

In another design, the AF mode or the DF mode may be selected based on expected channel conditions observed by relay station 120 and/or downstream station 122. The AF mode may have better performance and may be selected when channel conditions are good. Conversely, the DF mode may have better performance and may be selected when channel conditions are poor. Channel conditions may be quantified by a signal-to-noise ratio (SNR), BER, PER, or some other link metric. In one design, SNR may be set equal to the lower of a first SNR observed by relay station 120 and a second SNR observed by downstream station 122. The SNR may be compared against an SNR threshold. The AF mode may be selected if the SNR is greater than the SNR threshold. The DF mode may be selected if the SNR is less than the SNR threshold. In another design, BER may be set equal to the higher of a first BER observed by relay station 120 and a second BER observed by downstream station 122. The BER may be compared against a BER threshold. The AF mode may be selected if the BER is less than the BER threshold. The DF mode may be selected if the BER is greater than the BER threshold. The SNR or BER may be determined periodically, and the AF mode or the DF mode may be selected whenever the SNR or BER is determined. The AF mode or the DF mode may also be selected based on PER or some other link metric in similar manner using a suitable threshold for the metric.

In yet another design, the AF mode or the DF mode may be selected based on network management. The AF mode may be selected, e.g., when shorter latency is desired. Conversely, the DF mode may be selected, e.g., when lower BER is desired. The AF mode or the DF mode may also be selected based on other criteria for network management. For example, the AF mode may be selected if there is a good channel, e.g., the BER of data sent via the channel is low. If the BER exceeds a threshold, then the DF mode may be selected.

In one design, relay station 120 may periodically transmit pilot or reference signal, which may be used to determine one or more link metrics. For example, the pilot or reference signal may be used by upstream station 118 or downstream station 122 to determine round trip delay (RTD), which may be used to compute hop distance between relay station 120 and the upstream or downstream station. The pilot or reference signal may also be used to determine channel conditions, e.g., SNR, signal strength, channel impulse response, etc.

Relay station 120 may also determine one or more link metrics for the link from the upstream or downstream station to relay station 120 based on pilot or reference signal transmitted periodically by the upstream or downstream station.

In yet another aspect, relay station 120 may support NACK Type 1 and NACK Type 2 when operating in the DF mode. Upstream station 118 may send a transmission of a packet with channel encoding and with or without PAPR encoding. Relay station 120 may receive the transmission of the packet from upstream station 118. Relay station 120 may perform PAPR detection to detect for high PAPR or may perform PAPR decoding. Relay station 120 may send NACK Type 1 if high PAPR is detected or PAPR decoding fails. Relay station 120 may decode the packet if high PAPR is not detected or PAPR decoding passes. Relay station 120 may send NACK Type 2 if the packet is decoded in error and may send ACK if the packet is decoded correctly. Upstream station 118 may send another transmission of the packet if NACK Type 1 or NACK Type 2 is received from relay station 120.

Figure 6:
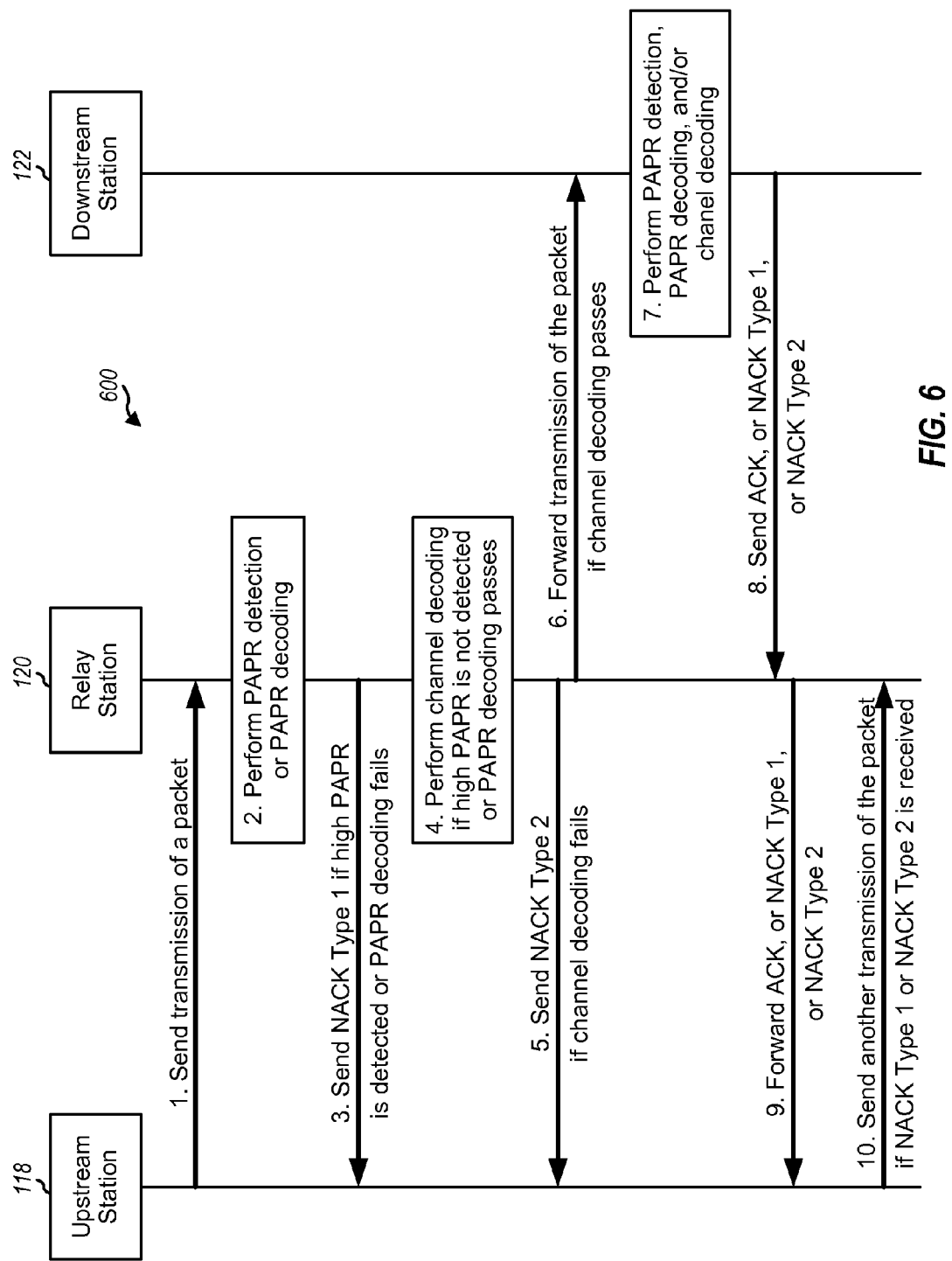
FIG. 6 shows a message flow for data transmission via the relay station in the DF mode with NACK Type 1 and NACK Type 2.

FIG. 6 shows a design of a message flow 600 for data transmission via relay station 120 in the DF mode with NACK Type 1 and NACK Type 2. Upstream station 118 may generate an HARQ transmission for a packet with channel encoding and possibly with PAPR encoding. Upstream station 118 may send the HARQ transmission to downstream station 118 (step 1). Relay station 120 may receive the HARQ transmission from upstream station 118 and may perform PAPR detection or PAPR decoding (step 2). Relay station 120 may send NACK Type 1 to upstream station 118 if high PAPR is detected or PAPR decoding fails (step 3). Relay station 120 may perform channel decoding if high PAPR is not detected or PAPR decoding passes (step 4). Relay station 120 may send NACK Type 2 to upstream station 118 if channel decoding fails (step 5). Relay station 120 may forward the HARQ transmission to downstream station 122 and may send ACK to upstream station 118 if channel decoding passes (step 6).

Downstream station 122 may receive the HARQ transmission from relay station 120 and may perform PAPR detection, PAPR decoding, and/or channel decoding (step 7). Downstream station 122 may send NACK Type 1 if high PAPR is detected or PAPR decoding fails, or NACK Type 2 if channel decoding fails, or ACK if channel decoding passes (step 8). Relay station 120 may receive NACK Type 1, or NACK Type 2, or ACK from downstream station 122 and may forward the ACK or NACK to upstream station 118 (step 9).

Upstream station 118 may send another HARQ transmission for the packet if NACK Type 1 or NACK Type 2 is received from relay station 120 or downstream station 122 (step 10). Upstream station 118 may terminate transmission of the packet if ACK is received from relay station 120 or downstream station 122.

Figure 7:
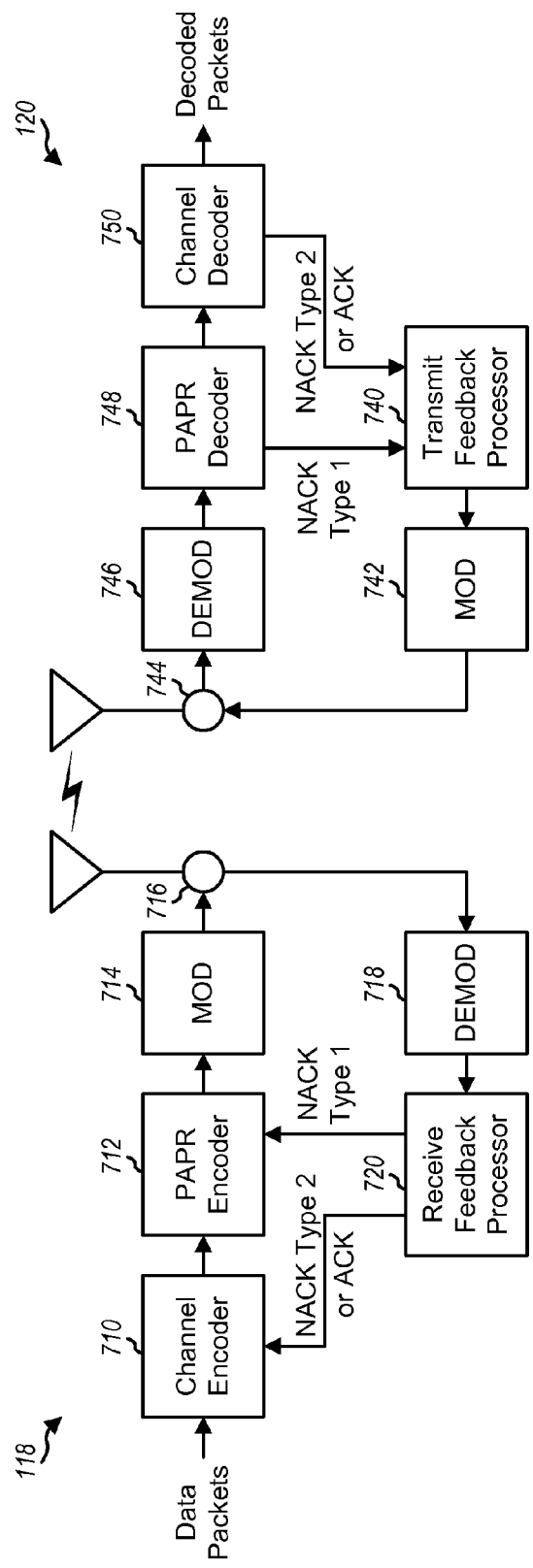
FIG. 7 shows a block diagram of the upstream station and the relay station, which support the message flow in FIG. 6.

FIG. 7 shows a block diagram of another design of upstream station 118 and relay station 120, which may support message flow 600 in FIG. 6. At upstream station 118, a channel encoder 710 (which may be part of transmit processor 310 or 370 in FIG. 3) may receive a packet of data to send to downstream station 122 and may process the packet to obtain a corresponding coded packet. For HARQ, channel encoder 710 may partition the coded packet into multiple blocks of code bits, one block for each HARQ transmission. Channel encoder 710 may also interleave (or reorder) each block of code bits and may map the interleaved bits to data symbols.

A PAPR encoder 712 (which may also be part of transmit processor 310 or 370) may process each block of data symbols for PAPR reduction and may provide a corresponding block of output symbols having lower PAPR in an output signal. PAPR encoder 712 may implement a PAPR reduction technique such as selective mapping (SM), partial transmit sequences (PTS), etc. For selective mapping, PAPR encoder 712 may map a block of data symbols to a set of symbol sequences, all representing the same information. PAPR encoder 712 may then select the symbol sequence with the lowest PAPR for transmission. For partial transmit sequences, PAPR encoder 712 may rotate the phase of a block of data symbols to obtain a set of symbol sequences conveying similar information and may select the symbol sequence with the lowest PAPR for transmission. PAPR encoder 712 may provide side information, which may indicate the selected symbol sequence being transmitted. PAPR encoder 712 may also implement other PAPR reduction techniques. PAPR encoder 712 may also pass control symbols and pilot symbols received from channel encoder 710. The symbols from PAPR encoder 712 may be processed by a modulator 714, routed through a duplexer/switch 716, and transmitted to relay station 120.

Relay station 120 may receive the signal from upstream station 118. The received signal may be routed through a duplexer/switch 744 and conditioned by a demodulator 746 to obtain input samples. Demodulator 746 may further process the input samples (e.g., for OFDM, SC-FDM, etc.) to obtain received symbols. A PAPR decoder 748 (which may be part of receive processor 350 in FIG. 3) may perform PAPR decoding on the received symbols in a manner complementary to the PAPR encoding performed by upstream station 118. The PAPR decoding may be performed (i) based on the side information if sent by upstream station 118 or (ii) blindly for all possible symbol sequences that could have been transmitted. PAPR decoder 748 may provide NACK Type 1 if PAPR decoding fails and may provide demodulated symbols if PAPR decoding passes. A channel decoder 750 (which may also be part of receive processor 350 in FIG. 3) may process (e.g., symbol demap, deinterleave, and decode) the demodulated symbols to obtain a decoded packet. Channel decoder 750 may also check the decoded packet based on the CRC for that packet to determine whether the packet is decoded correctly or in error. Channel decoder 750 may provide NACK Type 2 if the packet is decoded in error or ACK if the packet is decoded correctly.

Relay station 120 may generate feedback information, which may comprise NACK Type 1 from PAPR decoder 748 or NACK Type 2 or ACK from channel decoder 750. The feedback information may be processed by a transmit feedback processor 740 (which may be part of transmit processor 340 in FIG. 3) and further processed by a modulator 742, routed through duplexer/switch 744, and transmitted to upstream station 118.

Upstream station 118 may receive the signal from relay station 120, and the received signal may be routed through duplexer/switch 716 and processed by a demodulator 718 to obtain received symbols. A receive feedback processor 720 (which may be part of receive processor 320 or 380 in FIG. 3) may process the received symbols to recover the feedback information sent by relay station 120. Upstream station 118 may control data transmission based on the feedback information. For example, upstream station 118 may generate another HARQ transmission with (i) new PAPR encoding if NACK Type 1 is received or (ii) new channel encoding and new PAPR encoding if NACK Type 2 is received. Upstream station 118 may then send the HARQ transmission for the packet. Upstream station 118 may also terminate transmission of the packet if ACK is received from relay station 120.

FIG. 7 shows an exemplary design of upstream station 118 and relay station 120, which support two-level ACK/NACK feedback. For the first level, PAPR decoder 748 may perform PAPR decoding on the received symbols and determine whether a received symbol sequence is sufficiently close (e.g., in distance) to the selected symbol sequence (if side information is sent) or sufficiently close to a valid symbol sequence (if side information is not sent). PAPR decoder 748 may provide NACK Type 1 if the received symbol sequence is not sufficiently close to the selected symbol sequence or the valid symbol sequence. Relay station 120 may send NACK Type 1 to upstream station 118, which may transmit another symbol sequence to relay station 120 in response to NACK Type 1. Relay station 120 may skip channel decoding if NACK Type 1 is generated and sent.

For the second level, channel decoder 750 may decode the demodulated symbols from PAPR decoder 748 to obtain a decoded packet and may perform CRC check on the decoded packet. Channel decoder 750 may provide NACK Type 2 if the packet is decoded in error and may provide ACK if the packet is decoded correctly. Relay station 120 may send NACK Type 2 or ACK to upstream station 118, which may send another HARQ transmission in response to NACK Type 2 or may terminate transmission of the packet in response to ACK.

In another design, upstream station 118 may generate an HARQ transmission for a packet with channel encoding and without PAPR encoding. In this design, upstream station 118 may be implemented as shown in FIG. 5. Relay station 120 may perform PAPR detection and channel decoding and may be implemented with PAPR detector 550 in FIG. 5 and channel decoder 750 in FIG. 7.

As noted above, relay station 120 may be configurable to operate in either the AF mode or the DF mode (e.g., based on hop distance or some other criteria). In one design, relay station 120 may support feedback of NACK Type 1 when operating in the AF mode, e.g., as shown in FIGS. 4A, 4B and 5. Relay station 120 may support feedback of NACK Type 1 and NACK Type 2 when operating in the DF mode, e.g., as shown in FIGS. 6 and 7.

In yet another aspect, upstream station 118 and downstream station 122 may each be configurable and may support single-level or multi-level NACK feedback. For example, single-level NACK feedback with only NACK Type 2 or two-level NACK feedback with both NACK Type 1 and NACK Type 2 may be selected for upstream station 118 based on the capability of relay station 120, the capability of downstream station 122, channel conditions, etc. Similarly, single-level NACK feedback or two-level NACK feedback may be selected for downstream station 122 based on the capability of relay station 120, the capability of upstream station 118, channel conditions, etc.

FIG. 8 shows a design of a process 800 for supporting communication. Process 800 may be performed by a relay station (as described below) or by some other entity. The relay station may receive a first transmission of a packet from an upstream station (block 812). The relay station may determine a PAPR of the first transmission (block 814). In one design, the relay station may compute the PAPR of the first transmission. In another design, the relay station may receive the PAPR of the first transmission from the upstream station.

The relay station may detect for high PAPR of the first transmission (block 816). In one design, the relay station may compare the PAPR of the first transmission against a threshold. The threshold may be determined based on decoding capability of the downstream station, channel conditions observed by the downstream station and/or the relay station, back-off of a power amplifier at the upstream station, and/or other criteria. The relay station may detect high PAPR if the PAPR of the first transmission exceeds the threshold.

The relay station may send a NACK to the upstream station if high PAPR is detected for the first transmission (block 818). The relay station may forward the first transmission to a downstream station if high PAPR is not detected for the first transmission (block 820). In one design of block 820, the relay station may amplify a signal comprising the first transmission from the upstream station and may transmit the amplified signal to the downstream station, without decoding the first transmission to recover the packet.

The relay station may skip forwarding the first transmission to the downstream station if high PAPR is detected for the first transmission (block 822). The relay station may receive a second transmission of the packet if NACK is sent to the upstream station for the first transmission. The first and second transmissions may comprise different redundancy information for the packet and may have different PAPRs.

FIG. 9 shows a design of a process 900 for transmitting data. Process 900 may be performed by an upstream station, which may be a base station for data transmission on the downlink or a wireless device for data transmission on the uplink. The upstream station may send a first transmission of a packet to a relay station for forwarding to a downstream station (block 912). The upstream station may send a second transmission of the packet to the relay station if NACK Type 1 is received from the relay station (block 914). NACK Type 1 may be sent by the relay station due to high PAPR detected for the first transmission. The upstream station may adjust at least one transmission parameter if NACK Type 1 is received from the relay station. For example, the upstream station may increase the back-off of a power amplifier at the upstream station in response to receiving NACK Type 1. The upstream station may also send the second transmission of the packet to the relay station if NACK Type 2 is received from the downstream station (block 916). NACK Type 2 may be sent by the downstream station due to the packet being decoded in error.

Figure 10:
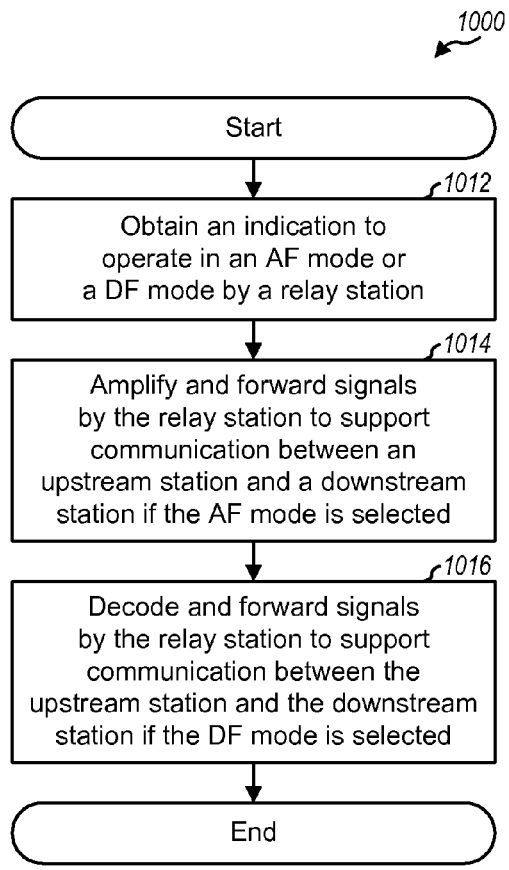
FIG. 10 shows a process for operating the relay station.

FIG. 10 shows a design of a process 1000 for supporting communication. Process 1000 may be performed by a relay station (as described below) or by some other entity. The relay station may obtain an indication to operate in an AF mode or a DF mode (block 1012). In one design, the relay station may select the AF mode or the DF mode. In another design, the relay station may receive the indication to operate in the AF mode or the DF mode from a base station or some other network entity. For both designs, the AF mode or the DF mode may be selected based on one or more criteria such as hop distance, received signal quality, BER, PER, etc. For example, the AF mode may be selected if the hop distance is less than a threshold, and the DF mode may be selected if the hop distance is greater than the threshold.

The relay station may amplify and forward signals to support communication between an upstream station and a downstream station if the AF mode is selected (block 1014). In one design, the relay station may receive a first signal from the upstream station, amplify the first signal to obtain a second signal, and transmit the second signal to the downstream station.

The relay station may decode and forward signals to support communication between the upstream station and the downstream station if the DF mode is selected (block 1016). In one design, the relay station may receive a first signal from the upstream station, decode the first signal to obtain decoded data, generate a second signal based on the decoded data, and transmit the second signal to the downstream station.

In one design, the relay station may support PAPR detection in the AF mode. In this design, the relay station may determine the PAPR of a signal received from the upstream station and may send NACK Type 1 to the upstream station if high PAPR is detected for the signal. In another design, the relay station may not support PAPR detection in the AF mode. In this design, the relay station may simply amplify and forward the signal received from the upstream station, without sending NACK Type 1 to the upstream station.

In one design, the relay station may support PAPR decoding and channel decoding in the DF mode. In this design, the relay station may perform PAPR decoding for a signal received from the upstream station and may perform channel decoding for the signal to obtain decoded data if the PAPR decoding passes. The relay station may send NACK Type 1 to the upstream station if the PAPR decoding fails. The relay station may send NACK Type 2 to the upstream station if the channel decoding fails. In another design, the relay station may support PAPR detection and channel decoding in the DF mode. In this design, the relay station may determine PAPR of the signal received from the upstream station and may send NACK Type 1 to the upstream station if high PAPR is detected for the signal. The relay station may perform channel decoding to obtain decoded data if high PAPR is not detected. The relay station may send NACK Type 2 to the upstream station if the channel decoding fails. In yet another design, the relay station may support only channel decoding in the DF mode. In this design, the relay station may perform channel decoding to obtain decoded data and may send NACK Type 2 to the upstream station if the channel decoding fails.

Figure 11:
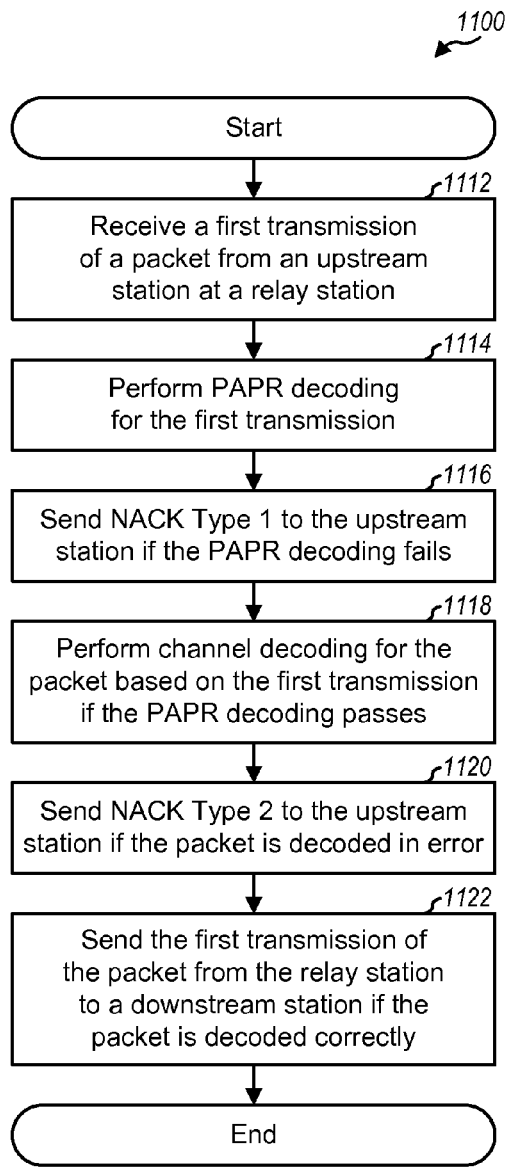
FIG. 11 shows a process for supporting communication by the relay station.

FIG. 11 shows a design of a process 1100 for supporting communication. Process 1100 may be performed by a relay station (as described below) or by some other entity. The relay station may receive a first transmission of a packet from an upstream station (block 1112). The relay station may perform PAPR decoding for the first transmission, e.g., based on selective mapping, or partial transmit sequences, or some other PAPR reduction technique used by the upstream station (block 1114). The relay station may send NACK Type 1 to the upstream station if the PAPR decoding fails (block 1116). The relay station may skip channel decoding for the packet if the PAPR decoding fails.

The relay station may perform channel decoding for the packet based on the first transmission if the PAPR decoding passes (block 1118). The relay station may send NACK Type 2 to the upstream station if the packet is decoded in error (block 1120). The relay station may send the first transmission of the packet to a downstream station if the packet is decoded correctly (block 1122).

The relay station may receive a second transmission of the packet from the upstream station if NACK Type 1 or NACK Type 2 is sent for the first transmission. The relay station may perform PAPR decoding for the second transmission and may send NACK Type 1 to the upstream station if the PAPR decoding fails. The relay station may perform channel decoding for the packet based on the first and second transmissions if the PAPR decoding passes. The relay station may send NACK Type 2 to the upstream station if the packet is decoded in error based on the first and second transmissions of the packet, which may be two HARQ transmissions for the packet.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   receiving a first transmission of a packet from an upstream station at a relay station;
   determining a peak-to-average-power ratio (PAPR) of the first transmission received at the relay station;
   sending a negative acknowledgement (NACK) to the upstream station if high PAPR is detected for the first transmission; and
   forwarding the first transmission to a downstream station if high PAPR is not detected for the first transmission.

2. The method of claim 1, further comprising:
   skipping forwarding of the first transmission to the downstream station if high PAPR is detected for the first transmission.

3. The method of claim 1, wherein the determining the PAPR of the first transmission comprises computing the PAPR of the first transmission by the relay station.

4. The method of claim 1, wherein the determining the PAPR of the first transmission comprises receiving the PAPR of the first transmission from the upstream station.

5. The method of claim 1, further comprising:
   comparing the PAPR of the first transmission against a threshold; and
   detecting high PAPR if the PAPR of the first transmission exceeds the threshold.

6. The method of claim 5, wherein the threshold is determined based on decoding capability of the downstream station, or channel conditions observed by the downstream station, or channel conditions observed by the relay station, or back-off of a power amplifier at the upstream station, or a combination thereof.

7. The method of claim 1, wherein the forwarding the first transmission comprises
   receiving a signal comprising the first transmission from the upstream station,
   amplifying the received signal to obtain an amplified signal, and
   transmitting the amplified signal to the downstream station, without decoding the first transmission to recover the packet.

8. The method of claim 1, further comprising:
   receiving a second transmission of the packet if the NACK is sent to the upstream station for the first transmission, wherein the first and second transmissions comprise different redundancy information for the packet and have different PAPRs.

9. An apparatus for wireless communication, comprising:
   means for receiving a first transmission of a packet from an upstream station at a relay station;
   means for determining a peak-to-average-power ratio (PAPR) of the first transmission received at the relay station;
   means for sending a negative acknowledgement (NACK) to the upstream station if high PAPR is detected for the first transmission; and
   means for forwarding the first transmission to a downstream station if high PAPR is not detected for the first transmission.

10. The apparatus of claim 9, further comprising:
    means for net-skipping forwarding of the first transmission to the downstream station if high PAPR is detected for the first transmission.

11. The apparatus of claim 9, further comprising:
    means for comparing the PAPR of the first transmission against a threshold; and
    means for detecting high PAPR if the PAPR of the first transmission exceeds the threshold.

12. An apparatus for wireless communication, comprising:
    at least one processor configured to:
      receive a first transmission of a packet from an upstream station at a relay station,
      determine a peak-to-average-power ratio (PAPR) of the first transmission received at the relay station,
      send a negative acknowledgement (NACK) to the upstream station if high PAPR is detected for the first transmission, and
      forward the first transmission to a downstream station if high PAPR is not detected for the first transmission.

13. The apparatus of claim 12, wherein the at least one processor is configured to skip forwarding of the first transmission to the downstream station if high PAPR is detected for the first transmission.

14. The apparatus of claim 12, wherein the at least one processor is configured to:
    compare the PAPR of the first transmission against a threshold, and
    detect high PAPR if the PAPR of the first transmission exceeds the threshold.

15. A computer program product, comprising:
    a non-transitory computer-readable medium comprising:
      code for causing at least one computer to receive a first transmission of a packet from an upstream station at a relay station,
      code for causing the at least one computer to determine a peak-to-average-power ratio (PAPR) of the first transmission received at the relay station,
      code for causing the at least one computer to send a negative acknowledgement (NACK) to the upstream station if high PAPR is detected for the first transmission, and
      code for causing the at least one computer to forward the first transmission to a downstream station if high P APR is not detected for the first transmission.

16. A method for wireless communication, comprising:
    sending a first transmission of a packet from an upstream station to a relay station for forwarding to a downstream station; and
    sending a second transmission of the packet to the relay station if a negative acknowledgement of a first type (NACK Type 1) is received from the relay station, the NACK Type 1 being sent by the relay station due to high peak-to-average-power ratio (PAPR) detected for the first transmission.

17. The method of claim 16, further comprising:
sending the second transmission of the packet to the relay station if a negative acknowledgement of a second type (NACK Type 2) is received from the downstream station, the NACK Type 2 being sent by the downstream station due to the packet being decoded in error.

18. The method of claim 16, further comprising:
adjusting at least one transmission parameter of the upstream station if NACK Type 1 is received from the relay station.

19. An apparatus for wireless communication, comprising:
means for sending a first transmission of a packet from an upstream station to a relay station for forwarding to a downstream station; and
means for sending a second transmission of the packet to the relay station if a negative acknowledgement of a first type (NACK Type 1) is received from the relay station, the NACK Type 1 being sent by the relay station due to high peak-to-average-power ratio (PAPR) detected for the first transmission.

20. The apparatus of claim 19, further comprising:
means for sending the second transmission of the packet to the relay station if a negative acknowledgement of a second type (NACK Type 2) is received from the downstream station, the NACK Type 2 being sent by the downstream station due to the packet being decoded in error.

21. The apparatus of claim 19, further comprising:
means for adjusting at least one transmission parameter of the upstream station if NACK Type 1 is received from the relay station.

22. A method for wireless communication, comprising:
receiving a first transmission of a packet from an upstream station at a relay station;
performing peak-to-average-power ratio (PAPR) decoding for the first transmission;
sending a negative acknowledgement of a first type (NACK Type 1) to the upstream station if the PAPR decoding fails;
performing channel decoding for the packet based on the first transmission if the PAPR decoding passes; and
sending a negative acknowledgement of a second type (NACK Type 2) to the upstream station if the packet is decoded in error.

23. The method of claim 22, further comprising:
skipping channel decoding of the packet if the PAPR decoding fails.

24. The method of claim 22, further comprising:
sending the first transmission of the packet from the relay station to a downstream station if the packet is decoded correctly.

25. The method of claim 22, wherein the performing PAPR decoding comprises performing PAPR decoding for the first transmission based on selective mapping (SM) or partial transmit sequences (PTS).

26. The method of claim 22, further comprising:
receiving a second transmission of the packet from the upstream station if NACK Type 1 or NACK Type 2 is sent for the first transmission.

27. The method of claim 26, further comprising:
performing PAPR decoding for the second transmission;
sending NACK Type 1 to the upstream station if the PAPR decoding fails for the second transmission;
performing channel decoding for the packet based on the first and second transmissions if the PAPR decoding passes for the second transmission; and
sending NACK Type 2 to the upstream station if the packet is decoded in error based on the first and second transmissions.

28. The method of claim 26, wherein the first and second transmissions of the packet are two hybrid automatic retransmission (HARQ) transmissions for the packet.

29. An apparatus for wireless communication, comprising:
means for receiving a first transmission of a packet from an upstream station at a relay station;
means for performing peak-to-average-power ratio (PAPR) decoding for the first transmission;
means for sending a negative acknowledgement of a first type (NACK Type 1) to the upstream station if the PAPR decoding fails;
means for performing channel decoding for the packet based on the first transmission if the PAPR decoding passes; and
means for sending a negative acknowledgement of a second type (NACK Type 2) to the upstream station if the packet is decoded in error.

30. The apparatus of claim 29, further comprising:
means for skipping channel decoding of the packet if the PAPR decoding fails.

31. The apparatus of claim 29, further comprising:
means for sending the first transmission of the packet from the relay station to a downstream station if the packet is decoded correctly.

* * * * *